(12) United States Patent
Kadar et al.

(10) Patent No.: US 11,189,182 B2
(45) Date of Patent: Nov. 30, 2021

(54) SYSTEM AND METHOD FOR MANAGING PEDAGOGICAL CONTENT

(71) Applicant: BrainPOP IP LLC, New York, NY (US)

(72) Inventors: Avraham Kadar, New York, NY (US); Raffi Kahane, New York, NY (US); Vincent Thomas J. Rowe, Portland, ME (US)

(73) Assignee: BrainPOP IP LLC, New York, NY (US)

( * ) Notice: Subject to any disclaimer, the term of this patent is extended or adjusted under 35 U.S.C. 154(b) by 8 days.

(21) Appl. No.: 15/834,107

(22) Filed: Dec. 7, 2017

(65) Prior Publication Data

US 2018/0102060 A1   Apr. 12, 2018

Related U.S. Application Data

(63) Continuation of application No. 14/501,698, filed on Sep. 30, 2014, now abandoned.

(60) Provisional application No. 61/884,480, filed on Sep. 30, 2013.

(51) Int. Cl.
*G09B 5/00* (2006.01)
*G09B 5/02* (2006.01)

(52) U.S. Cl.
CPC ..................... *G09B 5/02* (2013.01)

(58) Field of Classification Search
CPC .................... G09B 5/02; G09B 7/02
See application file for complete search history.

(56) References Cited

U.S. PATENT DOCUMENTS

| | | | | |
|---|---|---|---|---|
| 7,568,157 B1* | 7/2009 | Orr | ............ | G09B 7/02 434/322 |
| 2009/0035733 A1* | 2/2009 | Meitar | ............ | G09B 7/00 434/118 |
| 2009/0123903 A1* | 5/2009 | Weitenberner | ............ | G09B 7/00 434/323 |
| 2010/0216107 A1* | 8/2010 | Hines | ............ | G09B 5/06 434/307 R |
| 2013/0260896 A1* | 10/2013 | Miura | ............ | A63F 13/86 463/42 |
| 2014/0227675 A1* | 8/2014 | Budhu | ............ | G09B 7/02 434/362 |

* cited by examiner

*Primary Examiner* — Peter R Egloff
(74) *Attorney, Agent, or Firm* — Pearl Cohen Zedek Latzer Baratz LLP

(57) ABSTRACT

A system and method for managing pedagogical content are provided. A system and method may capture a screenshot of a presentation of educational or pedagogical content and convert the captured screenshot to an image. A system and method may receive comments from a student and include the comments and image in a pedagogical element, which may be stored in the student's account and may be submitted to a teacher for review, evaluation or assessment. A system and method may receive an assessment from a teacher and may include the assessment in the pedagogical element to produce a revised pedagogical element, which may be presented to the student. A system and method may provide a snapshot tool as a Flash library included in a source code of educational content.

14 Claims, 13 Drawing Sheets

Fig. 5

SEARCH　　　　　　　GO　　　　　　USER NAME

| MY BRAINPOP | |
|---|---|
| SEARCH BY TITLE　　　GO | |
| YOU SAVED 3 CELLS ACTIVITY PAGES<br>Jan. 11 2012 11:33 | ACTIVITY VIEW SUBMIT |
| YOU SAVED 1 UNDERGROUND<br>RAILROAD ACTIVITY PAGE<br>Jan 11 2012 9:55 | ACTIVITY VIEW SUBMITTED |
| YOU TOOK 3 SNAPSHOTS OF<br>CHRONOPTICON<br>Jan 10 2012 10:15 | GAME VIEW SUBMITTED |
| YOU TOOK A SNAPSHOT OF<br>BATTLESHIP NUMBERLINE<br>Jan 10 2012 10:44 am | GAME VIEW SUBMIT |
| YOU TOOK THE GAMEUP QUIZ ON<br>FOOD FIGHT<br>Jan 9 2012 11:31 am | MIXED 23/25 SUBMITTED<br>QUIZ |
| YOU TOOK THE FOUNDING LEADERS<br>QUIZ<br>Jan 9 2012 11:15 am | MIXED 23/25 SUBMITTED<br>QUIZ |
| YOU TOOK AIRPORT SECURITY QUIZ<br>ON BRAINPOP<br>Jan 9 2012 11:10 am | MIXED 23/25 SUBMITTED<br>QUIZ |

Fig. 6

MY BRAINPOP
← BACK
CELL COMMAND
MOBY THE ROBOT
1
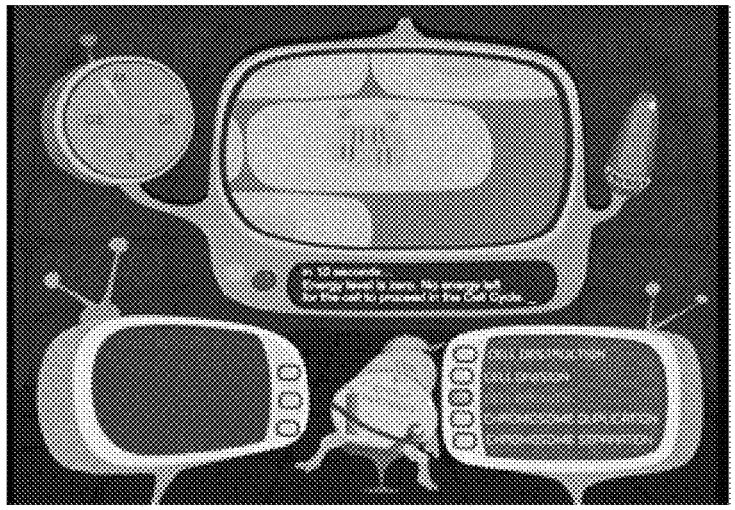
I MADE IT TO THE CHECKPOINT WHERE I DUPLICATED THE CHROMOSOMES !! I HAD SOME TROUBLE MISSING THE CELL GROWTH STEP, BUT I STARTED TAKING NOTES AND THAT HELPED A LOT. I HAD TO CHECK FOR ERRORS IN THE CHROMOSOMES AND I FOUND SOME. I FIXED THEM AND EVERYTHING SEEMED FINE AFTER THAT. THEN I RAN OUT OF ENERGY!!!!
2
Fig. 7

MY BRAINPOP

← BACK

CELL COMMAND

MOBY THE ROBOT

1 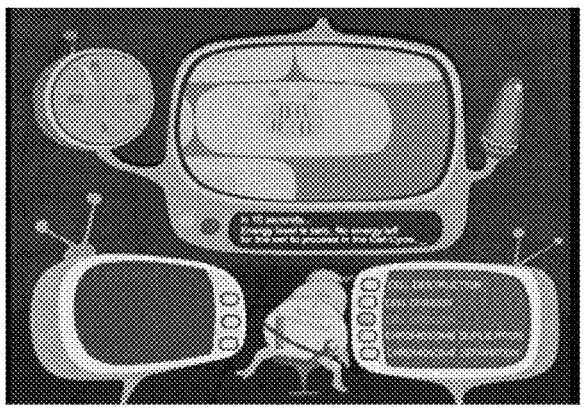 Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat.

I MADE IT TO THE CHECKPOINT WHERE I DUPLICATED THE CHROMOSOMES !! I HAD SOME TROUBLE MISSING THE CELL GROWTH STEP, BUT I STARTED TAKING NOTES AND THAT HELPED A LOT. I HAD TO CHECK FOR ERRORS IN THE CHROMOSOMES AND I FOUND SOME. I FIXED THEM AND EVERYTHING SEEMED FINE AFTER THAT. THEN I RAN OUT OF ENERGY!!!!

2 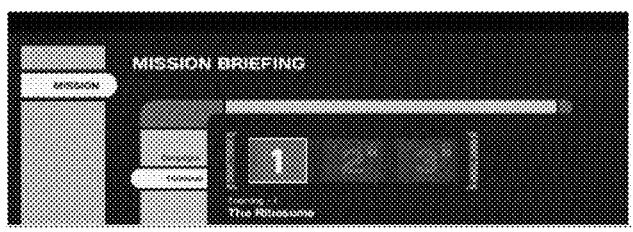 Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat.

Fig. 8

SYSTEM AND METHOD FOR MANAGING PEDAGOGICAL CONTENT

CROSS REFERENCE TO RELATED APPLICATIONS

This application is a Continuation Application of U.S. application Ser. No. 14/501,698 filed on Sep. 30, 2014 and which claims the benefit of U.S. Provisional Application Ser. No. 61/884,480, filed Sep. 30, 2013, which is hereby incorporated by reference in its entirety.

FIELD OF THE INVENTION

The present invention relates generally to managing pedagogical, educational or other content. More specifically, the present invention relates to methods, devices and systems for enabling students, pupils and teachers, instructors or tutors to exchange information related to educational content.

BACKGROUND OF THE INVENTION

Systems and methods for using electronic media and/or digital content for educational purposes are known. For example, E-learning (or eLearning) is known in the art. However, known systems and methods do not enable, for example, creating an artifact from, or based on, a learning activity, communicating the artifact to a teacher, enabling the teacher to edit or revise the artifact and return a revised artifact to the student.

SUMMARY OF THE INVENTION

A system and method for managing pedagogical content may capture a screenshot of a presentation of educational or pedagogical content and convert the captured screenshot to an image. A system and method may receive comments from a student and include the comments and image in a pedagogical element. A pedagogical element may be stored in the student's account. A pedagogical element may be submitted to a teacher for review, evaluation or assessment.

A system and method may receive an assessment from a teacher and may include the assessment in the pedagogical element to produce a revised pedagogical element. A revised pedagogical element may be presented to the student. A system and method may provide a snapshot tool as a Flash library included in a source code of educational content. A Flash library may be a code segment as known in the art.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 5 illustrates graphical user interface for saving and submitting activities in accordance with an embodiment of the invention;

FIG. 6 shows a graphical user interface presenting a time view of a snapshot session in accordance with an embodiment of the invention;

FIG. 7 shows a graphical user interface presenting game snapshots and user comments in accordance with an embodiment of the invention;

FIG. 8 shows a graphical user interface presenting a teacher's comments in accordance with an embodiment of the invention;

Figure 1:
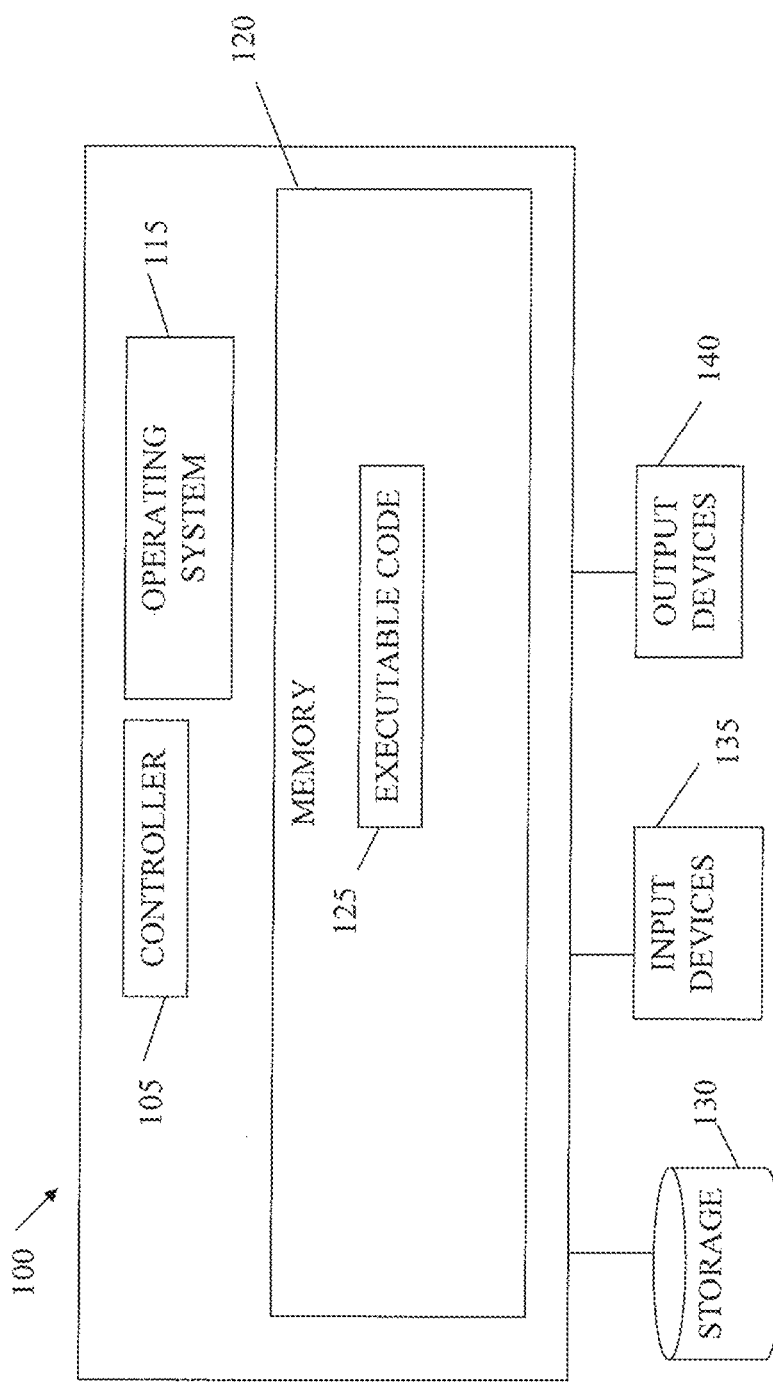
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

As referred to herein, pedagogical elements may be any structures or units of educational material. Pedagogical elements may be any objects, structures or units of educational material. A pedagogical element may be or may include a lesson, an assignment, an activity, a quiz, a discussion or any other relevant content. As described, a pedagogical element may be revised. For example, a student may add comments to a pedagogical element or mark a progress in a pedagogical element. A teacher may assess or review a pedagogical element and may further add content to a pedagogical element. For example, a teacher may add text to, or delete text from, a pedagogical element. A user may add content such as images or drawings to a pedagogical element.

Some embodiments of the present invention relate to a platform that may provide pedagogical or educational content in the form of elements. For example, pedagogical elements such as games, lessons plans, activities, animated movies and other content that may be used for teaching various subjects. A platform in accordance with an embodiment of the invention may be a comprehensive tool that enables teachers and students to submit, review and comment on work or activities related to various subjects or fields, e.g., reading, writing, vocabulary building, grammar or any other activities.

Reference is made to FIG. 1, showing high level block diagram of an exemplary computing device according to embodiments of the present invention. Computing device 100 may include a controller 105 that may be, for example, a central processing unit processor (CPU), a chip or any suitable computing or computational device, an operating system 115, a memory 120, a storage 130, input devices 135 and 1 output devices 140.

Operating system 115 may be or may include any code segment designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer or processor non-transitory storage medium, e.g., a RAM.

Executable code 125 may be any executable code, e.g., an application, a program, a process, task or script. Executable code 125 may be executed by controller 105 possibly under control of operating system 115. For example, when device 100 is used by a student, executable code 125 may be an application that creates an artifact from, or based on, a learning activity and communicates the artifact to a teacher. When device 100 is used by a teacher, executable code 125 may be an application that enables the teacher to edit or revise an artifact received from a student and return a revised artifact to the student.

Storage 130 may be or may include, for example, a hard disk drive, a CD-Recordable (CD-R) drive, a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

Modules or units, e.g., captureCrossDomain.js, cameraProxy.js and ScreenSender.as may include a storage medium such as memory 120, computer-executable instructions such as executable code 125 and a controller such as controller 105.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a mobile computer, a laptop computer, a server computer, a network device, or any other suitable computing device.

The term "Flash" as referred to herein may relate to the software platform provided by Adobe as known in the art.

The term "ActionScript" as referred to herein may relate to a script or application that is executed using Flash as known in the art.

The present invention enables a providing students and teachers with a tool (also referred to herein as "snapshot tool") that enables direct messaging between teachers students. Although for the sake of simplicity students and teachers are mainly referred to herein, it will be understood that any other users may be relevant, for example, some embodiments of the invention may be used by pupils, instructors, etc.

As described herein, a snapshot tool provided by embodiments of the invention enables capturing content in a display screen of a student, enabling the student to add information to the captured content and sending the captured content and added information to a teacher or other recipient. In an exemplary scenario carried out by a system according to an embodiment, a student is provided with a pedagogical element such as a game. During the game (e.g., when completing a level in the game), a snapshot of the screen is captured. The snapshot is then converted to an image (e.g., according to the Joint Photographic Experts Group (JPEG) format). The image is saved in the student's account. A system may then enable the student to associate content with the image. For example, the student is provided, by a system, with a text tool for entering text and associating the text with the image. For example, the image and text are included in a pedagogical element and the pedagogical element is stored in associating with the student's account.

The pedagogical element may be submitted to a teacher. The teacher may add content to the pedagogical element. For example, the teacher may be provided with a text tool, a draw tool and/or an erase tool and may use these tools to add an assessment to the pedagogical element. A pedagogical element that includes an assessment from a teacher may be provided to the student.

As described herein, a tool provided by some embodiments of the invention enables a teacher to review content received from a student, revise the content or add information to the content, and return the revised or modified content to the student. Accordingly, a system and method according to some embodiments of the invention enable students to use, consume, or interact with educational or other content and provide teachers with feedback related to the content, where the feedback is provided with at least a snapshot related to the content. A system and method according to some embodiments of the invention enable teachers to return feedback or instructions to students where the feedback or instructions from teachers include a snapshot of the relevant content. A tool described herein may be part of, or included in an online system that connects teachers and students and allows direct messaging between the teachers and each of the students or direct messaging between a teacher and a group of students.

As described herein, a snapshot tool may draw, capture or obtain student assessment data. For example, in an embodiment, the snapshot tool captures a screenshot of a display of a student's computer (that may be similar to device 100) and the snapshot tool may further enable the student to add comments or other information to the screenshot to generate assessment data.

In an embodiment, the snapshot tool enables or allows easy transfer of assessment data to the teacher, the snapshot tool enables the teacher to revise the assessment data (e.g., add comments) and send the revised assessment data back to the student.

In an embodiment, the snapshot tool captures a screenshot of content on a display of a student (e.g., content such as a video, a game or educational content), converts the screenshot into an image (e.g., as a JPG file), and saves an image of the screenshot.

In an embodiment, the snapshot tool enables a user (e.g., a student) to write comments related to the captured screenshot and the snapshot tool further submits the image of the captured screenshot and comments of the user to a teacher or to a system.

Accordingly, an embodiment of the invention may create an artifact from a learning activity, and send the artifact to a teacher for assessment. For example, an embodiment may include packaging of the snapshot tool as a Flash library so that it may be included in a source code of a Flash game or content, that allows easily implementation of the snapshot tool within that Flash game or content.

Figure 2:
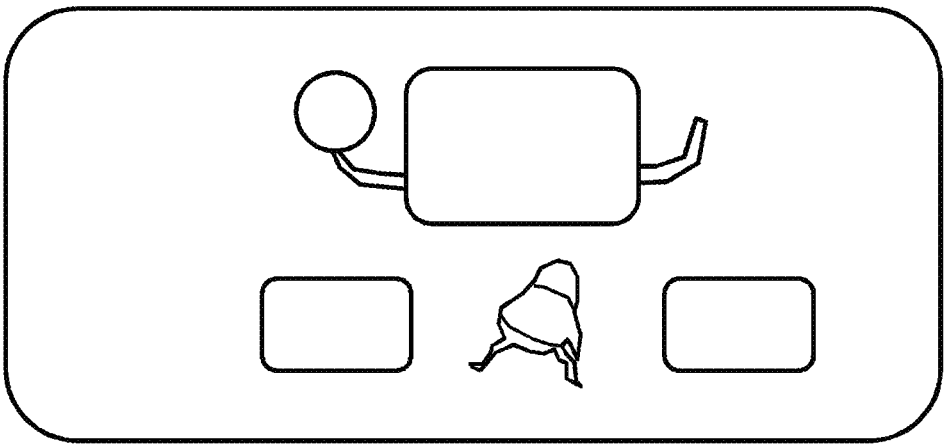
FIG. 2 shows a graphical user interface snapshot tool button in accordance with an embodiment of the invention.

When running on a user's device, a module or unit, e.g., the snapshot tool, may include a graphical user interface (GUI) button labeled "TAKE SNAPSHOT". Reference is made to FIG. 2 that shows a screen capture of an exemplary screen that may be presented on a display of a user. As shown by button 210, a "TAKE SNAPSHOT" button may be added to content presented by a game or other entity. For example, code included in the code that generates and/or presents a game as shown by FIG. 2 may cause button 210 to be presented as shown.

Clicking button 210 may cause a screenshot to be taken and stored. In some cases, the clicking button 210 may also trigger or cause a quick white flash over the game with an accompanying shutter sound to indicate, with minimal disruption to the play, that a snapshot was taken. In an embodiment, when clicked, button 210 may briefly but prominently change color (e.g., to read) and may further replace (e.g., for three seconds) the label of "TAKE SNAPSHOT" to "SNAPSHOT SAVED". Accordingly, a system and method may enable a user to store a snapshot of a screen by clicking a button embedded in content presented by an application. Otherwise described, a button used by a user to capture and store a screenshot may be included in content presented by any application and a user may use the button within the context or screen of the application, without having to leave or exit the application.

Figure 3:
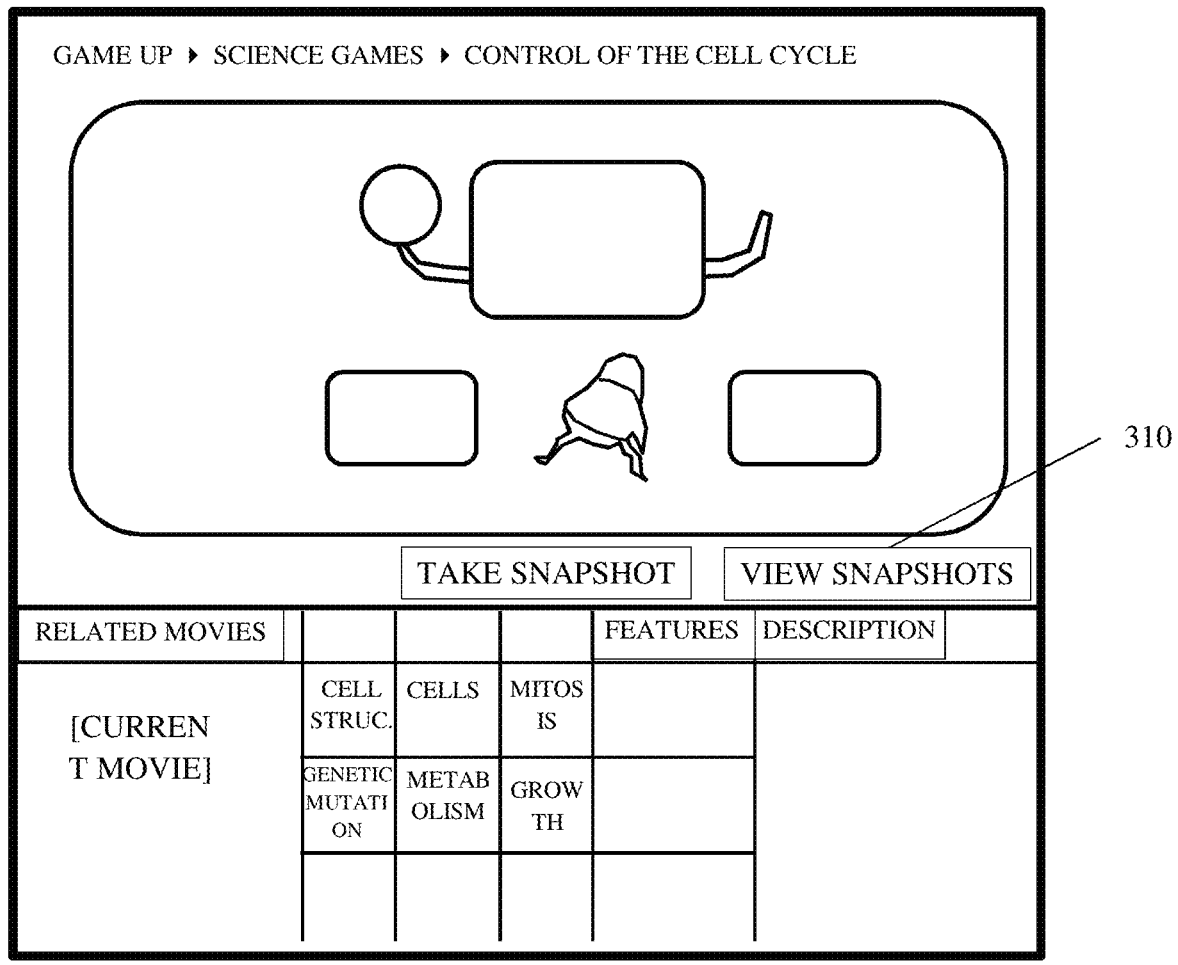
FIG. 3 shows a graphical user interface view snapshots button in accordance with an embodiment of the invention.

Once a snapshot has been saved, a "VIEW SNAPSHOTS" button may be added. Reference is made to FIG. 3 that shows a screen capture of an exemplary screen that may be presented on a display of a user. As shown by button 310, a "VIEW SNAPSHOTS" button may be added to content presented by a game or other entity. For example, the button may be added using a system and method as described with reference to button 210. Accordingly, a system and method may enable a user to view snapshots by clicking a button embedded in content presented by an application.

Clicking the "VIEW SNAPSHOTS" button may launch a pop-up with a text entry field for the user to write comments about his or her snapshots. For example, all snapshots may be presented (e.g., as thumbnails or in full size) with the most recent snapshot in focus. A roll of preview thumbnails may be provided to allow a user to select, edit, delete and rearrange snapshots. A unit may enable a user to save any number of snapshots snapshots in each session. In some embodiments, the number of snapshots that may be saved for each session may be limited by a threshold, e.g., only five snapshots may be saved and/or submitted as further described herein.

When a session ends, e.g., the user has finished or completed a game session, a unit or module may enable the user to submit the screenshots, e.g., to a database or to a teacher. For example, a system as described herein may include user accounts that may be stored on and supported by a server and screenshots and any content generated by a user (e.g., comments added to a screenshot) may be stored in a user's account. For example, all screenshots and related comments may be stored as a group that may be associated with the session that the user was involved in when the screenshots were taken. A group of screenshots (or an individual, or specific screenshot) may be associated with a game, a lesson, an activity, a teacher, a subject (e.g., history, geography etc.), a timestamp or any other metadata.

A system and method may enable a user to edit saved screenshots. For example, clicking on a saved screenshot presented as described herein may open or display the saved screen shot and enable editing the saved screenshot. A system and method may enable a user to save a screenshot after editing.

Figure 4:
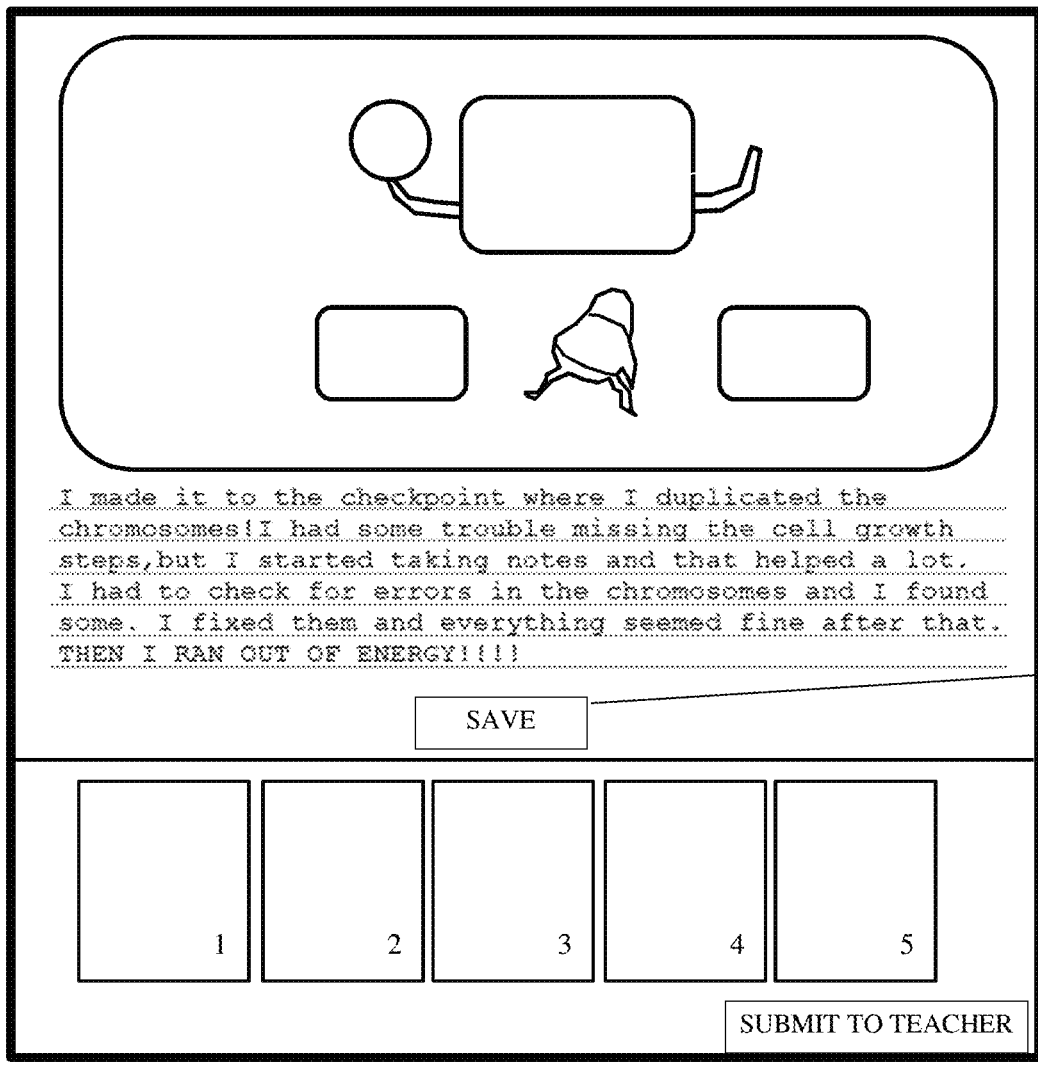
FIG. 4 illustrates graphical user interface for editing and saving snapshots in accordance with an embodiment of the invention.

Reference is made to FIG. 4 that shows a screen capture of an exemplary screen that may be presented on a display of a user. As shown by button 410, a "SAVE" button may be added to content in a saved snapshot, e.g., a snapshot saved in a user's account as described. For example, button 410 may be added using a system and method as described with reference to button 210. Accordingly, a system and method may enable a user to edit screenshots and save edited or modified snapshots by clicking a button embedded in content presented by an application.

Clicking the button 410 may add any text entered by a user to the saved snapshot A spinner may be presented while changes to a screenshot are being saved, e.g., locally, on the user computer or device or on a remote server. The save button (e.g., button 410) may be removed after saving a screenshot. The save button may automatically be presented when a text field is selected again, or when a different screenshot is selected for editing. For example, when clicking a saved screenshots, text field for entering text may be presented in a window as shown in FIG. 4, above save button 410.

A system and method may enable supervising of an activity. For example, a teacher may be involved in educational activities of students by receiving activity reports from students, receiving comments from students, providing assessments etc. For example, an activity page may be presented as described herein and may further be used to enable students and teachers or personnel to exchange or communicate information related to activities as described herein.

Figure 5:
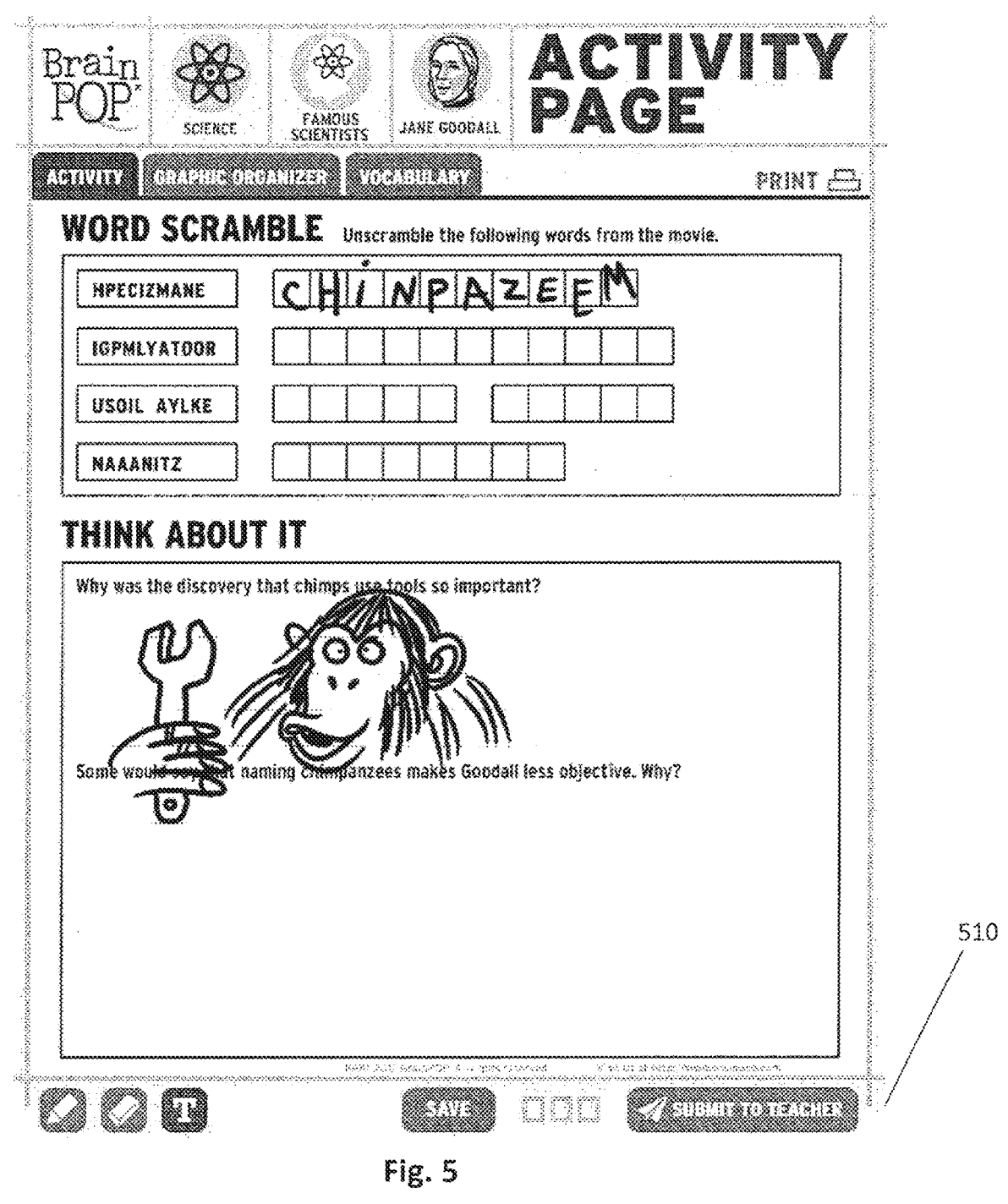

Reference is made to FIG. 5 that shows a screen capture of an exemplary screen that may be presented on a display of a user. As shown by the row of buttons 510 at the bottom of the page, other than a save button and a submit button, an edit button, an erase button and an edit button may be included in a display.

Typically, only one tool (represented by buttons 510) may be active at a given time. A default button may be made the active button by a system, e.g., the text entry tool may be active by default. The button of the currently active tool may be darkened or made to match the color of the active tab at the top of the page. It will be understood that any buttons may be presented in any screen, e.g., based on a configuration of the unit that presents the buttons. For example, in one configuration, an application that presents buttons as described herein may only cause the drawing tools to appear on the activity screen or tab but may remove the drawing button when a user moves to the vocabulary tab shown at the top of FIG. 5.

The save button may save the activity to the student's account. When an activity is saved, a row of progress boxes may be presented next to the save button as shown. For example, the boxes may represent the number of activity pages available for the current topic, and indicate the number of activities already completed. Information presented by the progress boxes (e.g., number of tasks or activities completed) may be stored on a server and may be presented to both a student and a teacher. Accordingly, a system and method may enable both student and teacher to track a progress of the student.

For example, when an activity is saved, the corresponding box will get a white fill to indicate that the activity has been saved. The submit to teacher button may only send data related the currently selected tab to the teacher. Submitting unsaved changes may automatically save those changes. Once an activity is submitted, the save and submit options may no longer be presented.

Snapshots (e.g., of a session) may be presented to a student. A presentation of snapshots taken during a session may include buttons to enable a student to review a snapshot, submit a snapshot or perform other actions.

Reference is made to FIG. 6 that shows a screen capture of an exemplary screen that may be presented on a display of a user. As shown, snapshots of a session may be presented, e.g., to a student, in a timeline view. A students can use a display as shown by FIG. 6 to submit snapshots by pressing the submit button shown next to each snapshot. A user may further view and edit a saved snapshot by clicking the view button next to the snapshot as shown in FIG. 6. For example, clicking the view button may cause a unit to open or present a page that may be similar to the activity view shown in FIG. 5.

Snapshots of a session or game may be displayed in a numbered column, with the student's comments placed under the corresponding snapshot. Reference is made to FIG. 7 that shows a screen capture of an exemplary screen that may be presented on a display of a user. As shown, text entered by a student, in connection to the snapshot, may be presented under the snapshot.

A system and method may enable a teacher to add comments to a snapshot and a system and method may present to a student comments related to the snapshot, as entered by a teacher.

Reference is made to FIG. 8 that shows a screen capture of an exemplary screen that may be presented on a display of a user. As shown, text entered by a teacher may be presented using a wider version of the page shown in FIG. 7 where an additional column on the right displays teacher's comments next to each snapshot.

Figure 9:
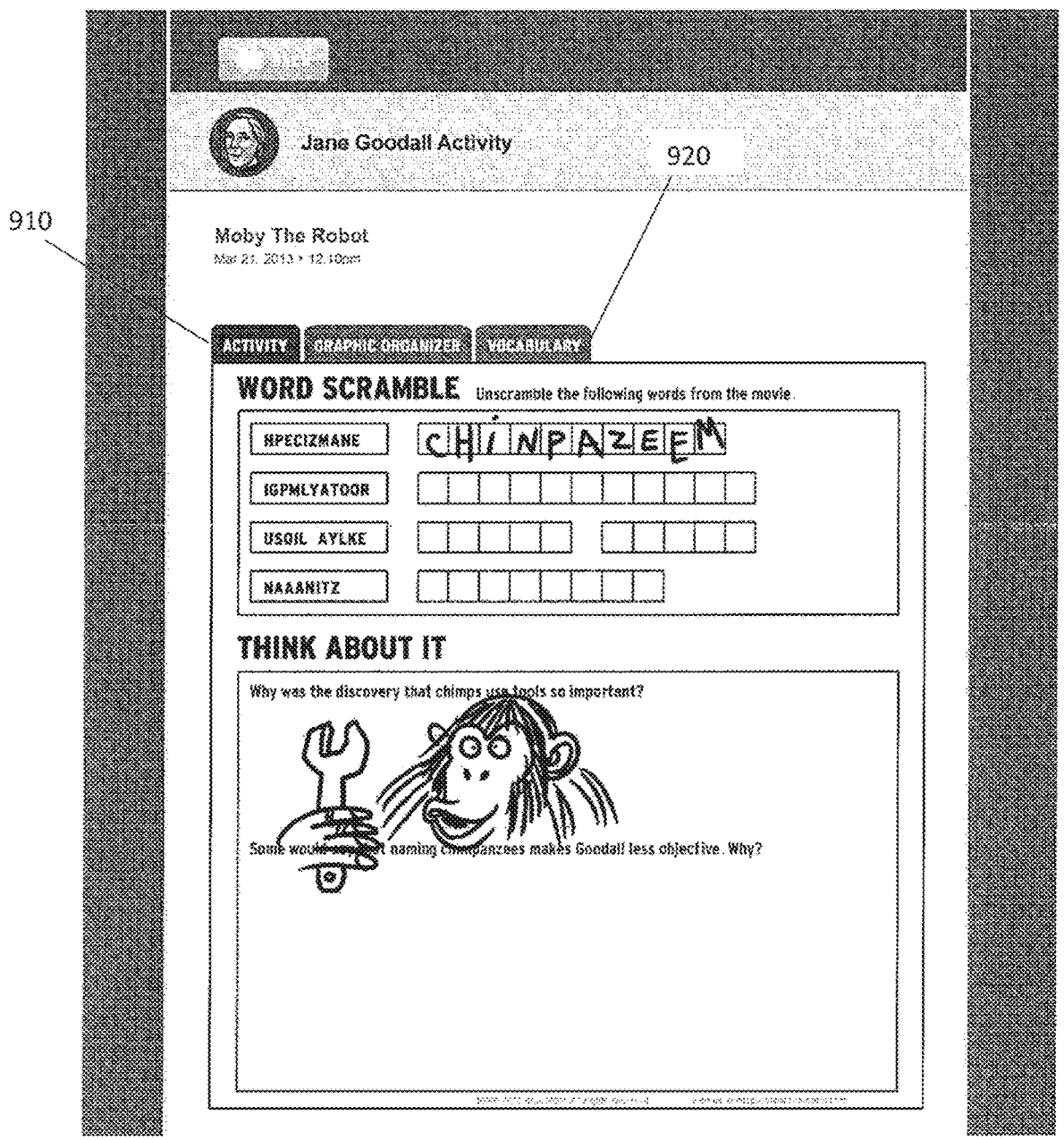
FIG. 9 shows a graphical user interface presenting saved activity pages in accordance with an embodiment of the invention.

As described herein, activities may be saved, e.g., including any text entered by a student that performed the activity. Reference is made to FIG. 9 that shows a screen capture of an exemplary screen that may be presented on a display of a user. For example, as described, snapshots (e.g., related to activities) may be submitted to, or saved on, a server. Saved snapshots may be sent from a server to a user's computer and presented thereon (e.g., presented on a computer of a student or teacher). As shown in FIG. 9, saved snapshots' pages may be displayed as single tabbed images, with the tabs allowing the user to toggle or scroll through their saved activities. As shown in FIG. 9, a set of tabs may present snapshots for a respective set of activities. For example, a first tab for vocabulary, and a second tab for activity may be presented.

For example, as shown, tab 910 is the one selected and therefore a saved snapshot of "activity" is shown. In this example, if the user selects tab 920, snapshots of activities related to vocabulary will be displayed.

In one embodiment, presenting tabs as shown in FIG. 9 is selective. For example, if no snapshots or other content were saved by a user for a specific topic, activity, subject or field, then a tab for that field or activity is not shown. For example, for a student who did not save any snapshots related to vocabulary activities, tab 920 is not shown. Accordingly, tab 920 being displayed as shown may be an indication that activities related to vocabulary were saved.

A system and method according to embodiments of the invention may enable a teacher (or any other authorized person) to review content submitted by students. For example, a teacher may open an activity submitted by a student, may add comments or other content to the saved activity and save the revised activity. The student may then open the revised activity and see any content added by the teacher. Content added by a teacher may be text, e.g., entered in dedicated text fields or it may be graphical content, e.g., an image or other a drawing, e.g., as exemplified in FIG. 11.

Figure 10:
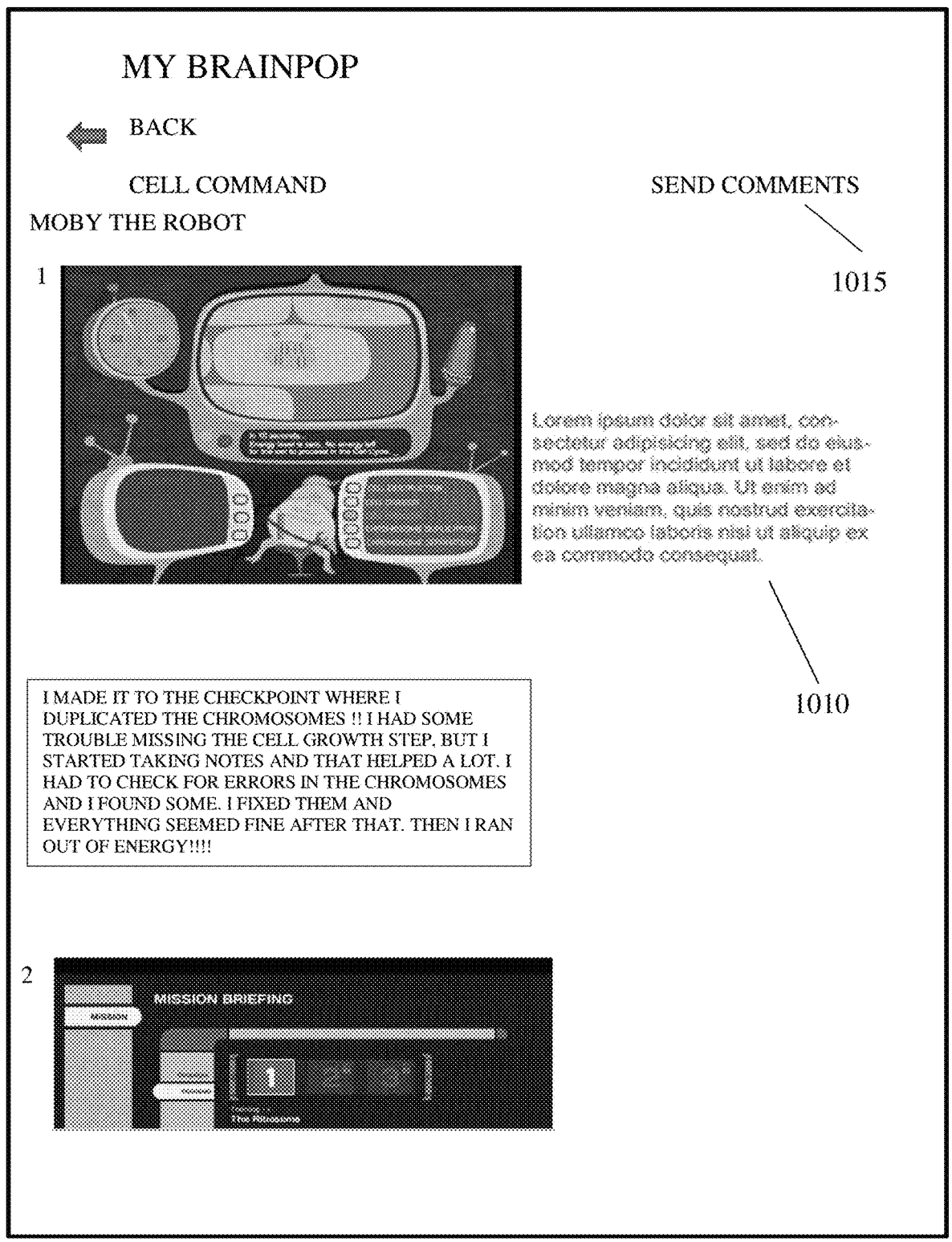
FIG. 10 shows a graphical user interface presenting a commenting screen in accordance with an embodiment of the invention.

Reference is made to FIG. 10 that shows a screen capture of an exemplary screen that may be presented on a display of a teacher. As shown by text entry field 1010, a text entry field may enable a teacher to enter text for, or in relation to, a saved snapshot. As shown by button 1015, a "SEND COMMENTS" button enables a teacher to send the comments. Sending comments may include at least storing or saving the revised snapshot on a server. Accordingly, a student may open a revised snapshot and see the comments or other content added by the teacher.

Figure 11:
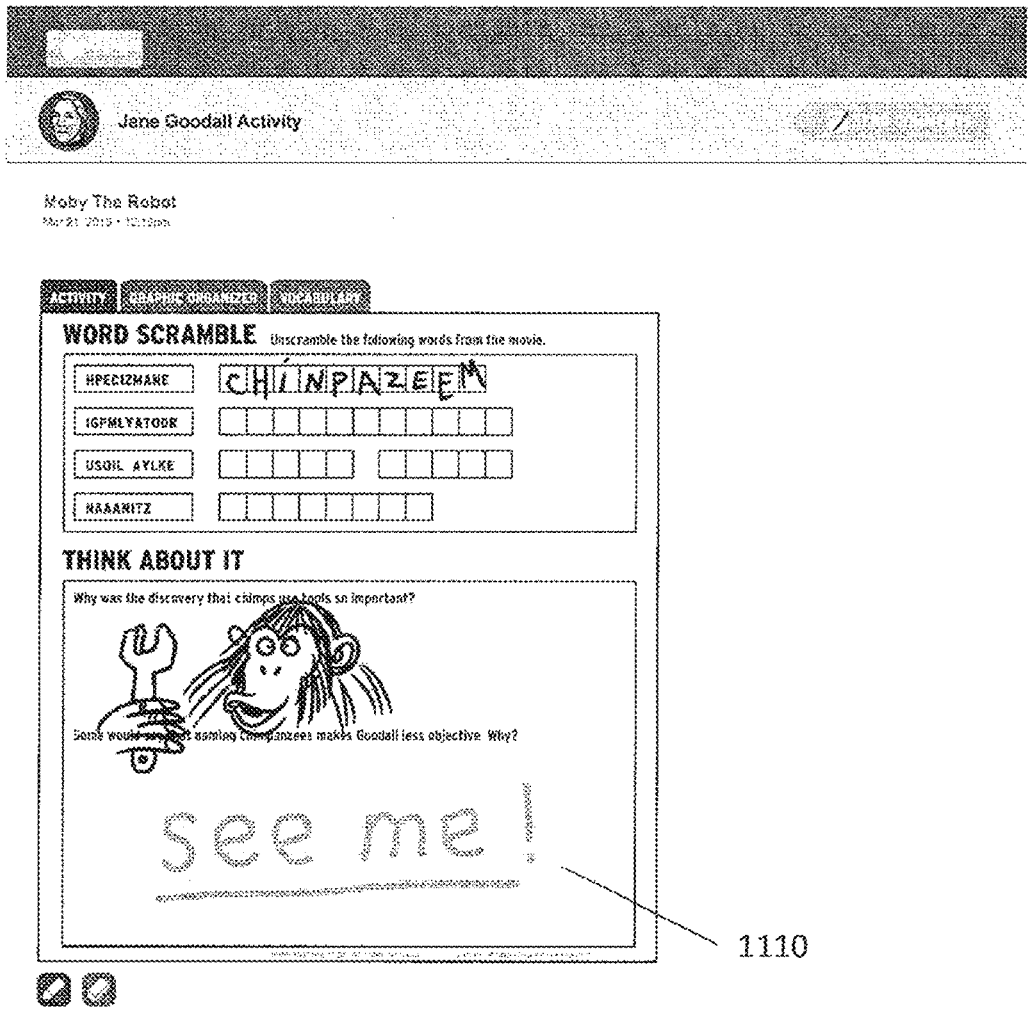
FIG. 11 illustrates draw and erase tools in accordance with an embodiment of the invention.

For reviewing activities, a teacher may be provided with a screen similar to the activity screen presented to a student. Reference is made to FIG. 11 that shows a screen capture of an exemplary screen that may be presented on a display of a teacher. As shown in FIG. 11, the same tabbed navigation may be used for both student and teacher. The teacher may further be provided with other graphic tools, e.g., a drawing tool that enables adding a drawing as shown by drawing 1110.

In an embodiment, clients are provided with executable code that is executed on their computers. In the description that follows, postMessage is a built-in browser method for communicating data between windows and ExternalInterface is a built-in Flash Player method for communicating data between Actionscripts and Javascripts.

For example, a precompiled Flash Actionscript (e.g., BrainPOPScreenSend.swc described herein) included in a Flash Actionscript 3 project is installed on clients' computers. For example, BrainPOPScreenSend.swc is code that captures screenshots from Flash, encodes captured screenshots or images, and the transfers images to Javascript.

In an embodiment, BrainPOPScreenSend.swc is imported into a Flash project. To initialize the core class of BrainPOPScreenSend.swc, a line of Actionscript is added to the project, for example, "var screenSender:ScreenSender=new ScreenSender(stage)". The project is then exported as, or converted to, swf file or format, and the swf code is then embedded in an HTML page that may be served to students and teachers. The HTML page may be hosted on any web site, and may be included as an iframe within a default HTML page of a site, e.g., www.BrainPOP.com.

To allow cross-domain communication between the Flash project and the HTML page, a JavaScript method (e.g., postMessage included in module or unit cameraProxy.js as described herein) is used as a bridge between the 2 domains.

In an embodiment, a software package installed on client computers includes a ScreenSender.as unit, module or class that manages capturing, encoding and transfer of images; a adobe.images.JPGEncoder.as class or unit that converts bitmap data into JPEG format images and known or public classes, e.g., adobe.images.BitString.as (documented at https://github.com/mikechambers/as3corelib) and dynamicflash.util.Base64.as (documented at http://dynamicflash.com/goodies/base64). Module or unit cameraProxy.js allows users to set the size and quality of captured images, and may communicate with both a Flash object and a web page at or in a web site. A JavaScript in a web page at a site (e.g., module or unit captureCrossDomain.js described herein) may communicate with the cameraProxy.js script and cause module or unit cameraProxy.js to capture images. Code in unit cameraProxy.js may enable users to set the size and quality of captured images, and may further communicate with both the Flash object and a web page at a web site.

A JavaScript (e.g., module or unit captureCrossDomain.js described herein) may store the captured snapshots or images and user text or other related content, may handle additions to, and removals from images, or perform other manipulations of stored snapshots as described herein. CameraProxy.js allows partners to set the size and quality of captured images, and can communicate with both Flash objects in a Flash project and any entity in a web page at a web site.

Figure 12:
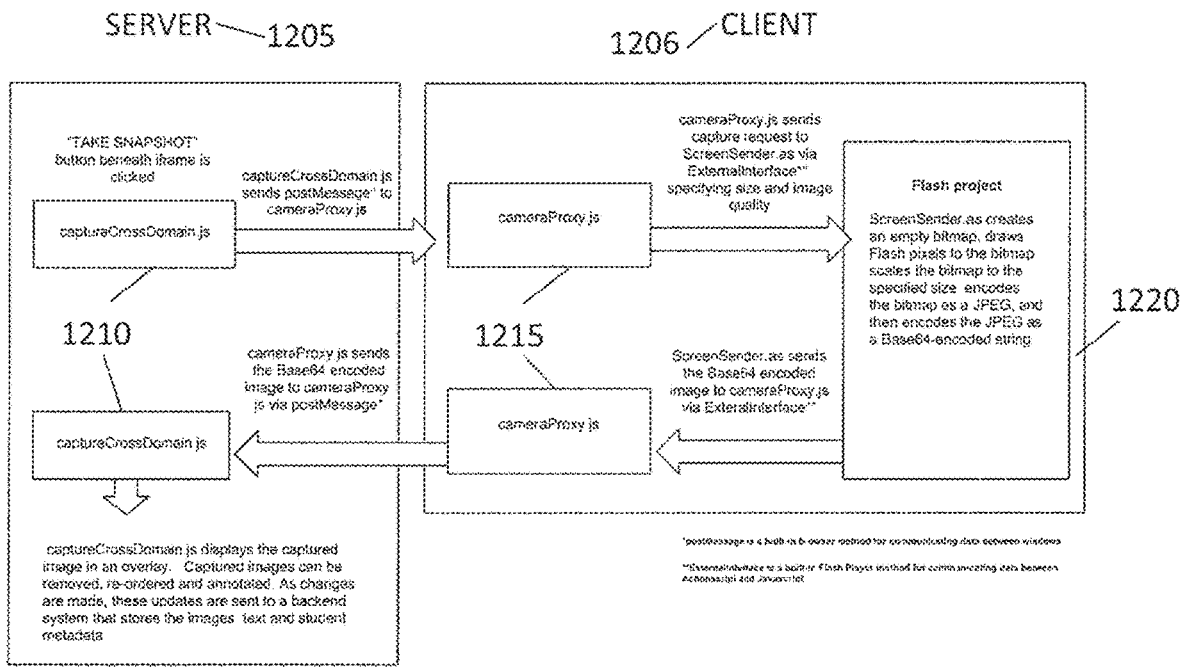
FIG. 12 shows an exemplary flow and components of a system in accordance with an embodiment of the invention.

An embodiment of the invention uses web technologies for capturing and tracking screenshots, notes and metadata from students and teachers. Reference is made to FIG. 12 that shows an exemplary flow and exemplary components according to embodiments of the invention. FIG. 12 shows a flow that may be used to capture, edit, save and present snapshots as described herein. As shown, a system or flow may include a server 1205 that may be a web server as known in the art. As shown, a system or flow may include a client 1206. The client side shown in FIG. 12 may be any user, e.g., a student or a teacher. For example, server 1205 and client 1206 may be computing devices similar to computing device 100 or may include similar elements. For example, server 1205 and client 1206 may each include a controller 105, memory 120 and executable code 125.

As shown, a system may include a cptureCrossDomain.js script 1210, a cameraProxy.js script 1215 and a Flash project 1220. As shown, module or unit captureCrossDomain.js may be executed when the "TAKE SNAPSHOT" button (e.g., present beneath an iframe) is clicked. As shown, module or unit captureCrossDomain.js may, using postMessage, send a message to cameraProxy.js on the client computer.

As shown, cameraProxy.js may, using ExternalInterface, send a capture request to ScreenSender.as (included in Flash project 1220 as shown) specifying in the capture request parameters such as size and image quality. As shown, in response to the request, ScreenSender.as may create an empty bitmap, draws Flash pixels to the bitmap, scale the bitmap to the specified size, encode the bitmap as a JPEG image, and then encode the JPEG as a Base64-encoded string to produce a Base64 encoded image.

As shown, ScreenSender.as may further send the Base64 encoded image to cameraProxy.js, using ExternalInterface. As shown, cameraProxy.js may send the Base64 encoded image to module or unit captureCrossDomain.js using postMessage. As shown, module or unit captureCrossDomain.js may display the captured image in an overlay. For example, the window shown in FIG. 4 is overlaid on or over a screen or presentation of a game. Otherwise described, module or unit captureCrossDomain.js may (possibly temporarily) superimpose any graphical content over a presentation of pedagogical content.

Captured images may be removed, re-ordered and annotated as described herein, e.g., by module or unit captureCrossDomain.js and based on user input. For example, additions or modifications to snapshots made by teachers and students as described herein may be performed by captureCrossDomain.js. As changes are made, updates may be sent, e.g., using an application programming interface (API), to a server or backend system that stores the images, text, student or teacher metadata etc. Once a screenshot and its associated data are stored on a server or backend system, a student can share/submit them to his teacher for comments. The teacher can then view the student's screenshot and/or text, make comments and send a revised screenshot back to the student. The student can then view his original screenshot and annotation as well as the teacher's textual comments or other input.

Figure 13:
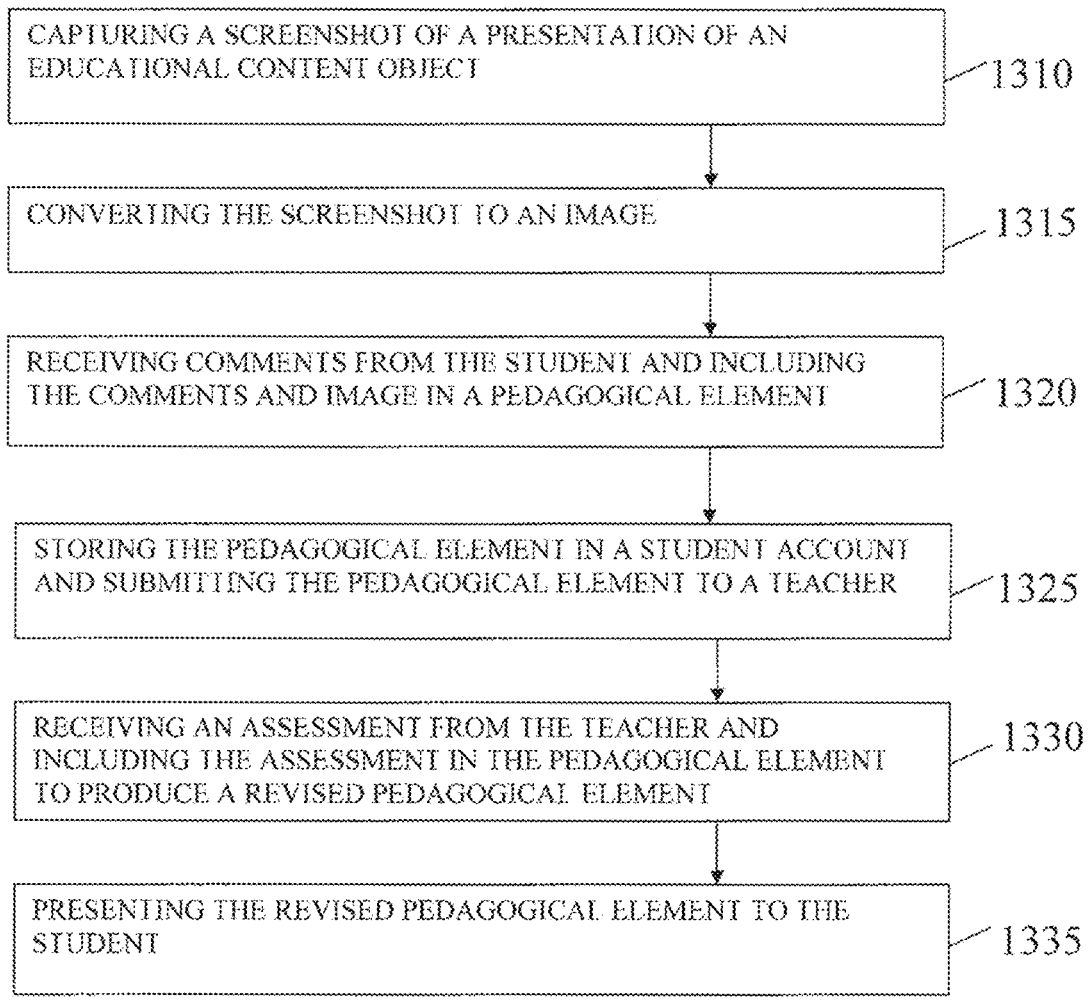
FIG. 13 is a flowchart describing a method according to embodiments of the invention.

Reference is made to FIG. 13, a flowchart describing a method according to certain embodiments of the invention. As shown by block 1310, a method or flow may include capturing a screenshot of a presentation of an educational content object. For example, an object presented may be a pedagogical element such as a game or activity. A "TAKE SNAPSHOT" may be embedded in the content object, presented to a student and used to capture a screenshot of a screen of a computer of the student. For example, the educational content object or pedagogical element and "TAKE SNAPSHOT" button may be presented by Flash code embedded included in a web page downloaded by the student.

As shown by block 1315, a method or flow may include converting the screenshot to an image. For example, a screenshot (that may be a bitmap as known in the art) is converted to JPEG format to produce an image file. As shown by block 1320, a method or flow may include receiving comments from the student and including the comments and image in a pedagogical element. For example, text entered by a student using a text field as described may be combined with an image of a screenshot and the combined content may be stored as a pedagogical element.

As shown by block 1325, a method or flow may include submitting the pedagogical element to a teacher. For example, after a pedagogical element is submitted by a student, the teacher is notified that a submission is waiting for review. A notification may include the students name or other details, the related subject etc.

As shown by block 1330, a method or flow may include receiving an assessment from the teacher and including the assessment in the pedagogical element to produce a revised pedagogical element. For example, comments or drawings (e.g., as shown by FIG. 11) may be entered by a teacher when reviewing work submitted by a student as described.

As shown by block 1335, a method or flow may include presenting the revised pedagogical element to the student. For example, a student may be notified that his or her work was reviewed by a teacher, may log into his or her account and may be presented with comments entered by the teacher with reference to submitted work.

Some embodiments may be provided in a computer program product that may include a non-transitory machine-readable medium, with instructions stored thereon, which may be used to program a computer, or other programmable devices, to perform methods as disclosed herein. Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. For example, in an embodiment, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a notebook computer, a workstation, a server computer, a network device, or any other suitable computing device. For example, a system as described herein may include one or more devices such as computing device 100.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of providing educational content, the method comprising:
    capturing, via a computing device, a screenshot of a display of a computer of a student of a presentation of the educational content;
    converting, via the computing device, the screenshot to an image;
    receiving, via the computing device, comments from a student on a server;
    creating, via the computing device, a pedagogical element by including the comments and the image in the pedagogical element and storing the pedagogical element in an account of the student;
    transmitting, via the computing device, the pedagogical element to a teacher on a teacher computer;
    presenting, via the teacher computer, the pedagogical element to a teacher on a single page;
    receiving, via the teacher computer, an assessment from the teacher;
    combining, via the teacher computer, the assessment into the pedagogical element to produce a revised pedagogical element, transmitting, via the teacher computer, the revised pedagogical element to the student, and presenting, via the computing device, the revised pedagogical element to the student.

2. The method of claim 1, wherein the assessment is one of: text, a drawing and an image.

3. The method of claim 1, comprising embedding a "TAKE SNAPSHOT" button in a source code of the educational content, the button usable for capturing a screenshot.

4. The method of claim 1, comprising including in a presentation of the pedagogical element at least one of: a "SAVE SNAPSHOT" button, a "SUBMIT" button and a "SEND COMMENTS" button.

5. The method of claim 1, wherein the pedagogical element is selected from a list consisting of a game, a lesson plan, a learning activity and an animated movie.

6. The method of claim 1, further comprising:
presenting the revised pedagogical element to the student, wherein the pedagogical element comprises an animated movie.

7. The method of claim 1, wherein presentation of the educational content comprises:
adding a "VIEW SNAPSHOTS" as an embedded button in content presented by a game;
enabling a user to view snapshots by clicking the button.

8. The method of claim 1, further comprising presenting one or more groups of screenshots that are associated with at least one of: a game, a learning activity, a teacher and a subject.

9. The method of claim 1, further comprising:
saving an activity of the student in the student's account; and
presenting a progress of a student as a row of progress boxes, wherein each progress box represents a number of activity pages available for a current topic.

10. The method of claim 5, further comprising presenting the captured screenshot as a superposition over a presentation of a pedagogical content.

11. A system for providing educational content, comprising:
a hardware unit for:
capturing a screenshot of a presentation of the educational content and for converting the screenshot to an image using a snapshot tool included in a source code of the educational content,
receiving comments from a student;
a hardware unit for:
including the comments and the image in a pedagogical element and storing the pedagogical element in an account of the student, and
submitting the pedagogical element to a teacher on a teacher computer; and
a hardware unit for:
presenting the pedagogical element to a teacher on a single page;
receiving an assessment from the teacher;
combining the assessment into the pedagogical element to produce a revised pedagogical element,
transmitting the revised pedagogical element to the student to be presented to the student.

12. The system of claim 11, wherein the assessment is one of: text, a drawing and an image.

13. The system of claim 11, wherein a "TAKE SNAPSHOT" button is embedded in a source code of the educational content, the button usable for capturing a screenshot.

14. The system of claim 11, wherein a presentation of the pedagogical element includes presenting at least one of: a "SAVE SNAPSHOT" button, a "SUBMIT" button and a "SEND COMMENTS" button.

* * * * *